(12) United States Patent
Lee et al.

(10) Patent No.: US 10,502,297 B2
(45) Date of Patent: Dec. 10, 2019

(54) PLANETARY GEAR TRAIN OF AUTOMATIC TRANSMISSION FOR VEHICLES

(71) Applicants: HYUNDAI MOTOR COMPANY, Seoul (KR); KIA MOTORS CORPORATION, Seoul (KR)

(72) Inventors: Kyeong Hun Lee, Seoul (KR); Jong Sool Park, Hwaseong-si (KR); Jong Soo Kim, Seoul (KR); Dong Hwan Hwang, Seoul (KR); Jin Ho Kim, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 217 days.

(21) Appl. No.: 15/709,995

(22) Filed: Sep. 20, 2017

(65) Prior Publication Data
US 2018/0306291 A1    Oct. 25, 2018

(30) Foreign Application Priority Data
Apr. 24, 2017   (KR) .......................... 10-2017-0052120

(51) Int. Cl.
*F16H 3/60* (2006.01)
*F16H 37/04* (2006.01)
*F16H 3/66* (2006.01)

(52) U.S. Cl.
CPC ............. *F16H 37/04* (2013.01); *F16H 3/666* (2013.01); *F16H 2037/048* (2013.01); *F16H 2200/006* (2013.01); *F16H 2200/2012* (2013.01); *F16H 2200/2043* (2013.01)

(58) Field of Classification Search
CPC ....................................................... F16H 3/666
See application file for complete search history.

(56) References Cited

U.S. PATENT DOCUMENTS 10,323,728 B2 * 6/2019 Lee .......................... F16H 3/666

\* cited by examiner

*Primary Examiner* — Derek D Knight
(74) *Attorney, Agent, or Firm* — Brinks Gilson & Lione

(57) ABSTRACT

A planetary gear train of an automatic transmission for a vehicle is provided to improve power delivery and fuel efficiency by applying five control elements to four planetary gear sets to achieve multiple speed stages. The planetary gear train may include: first to fourth planetary gear sets respectively having first to third rotational elements, fourth to sixth rotational elements, seventh to ninth rotational elements, tenth to twelfth rotational elements; an input shaft mounted with the first, second, and third planetary gear sets; and an output shaft mounted with the fourth planetary gear set; first to tenth shafts; and two transfer gears. In particular, the eighth shaft is fixedly connected with the tenth rotational element and externally engaged with the first shaft via a first transfer gear, the tenth shaft is fixedly connected with the twelfth rotational element and externally engaged with the sixth shaft via a second transfer gear.

16 Claims, 4 Drawing Sheets

FIG. 2

| Shift-stage | Clutch | | | Brake | | Gear ratio | Step ratio | Step ratio |
|---|---|---|---|---|---|---|---|---|
| | C1 | C2 | C3 | B1 | B2 | | | |
| REV | | | ● | ● | ● | -4.563 | - | Gear ratio span : 8.84<br><br>Ratio of REV vs D1 : -0.80 |
| N | | | | ● | ● | - | - | |
| D1 | ● | | | ● | ● | 5.696 | 1.544 | |
| D2 | | ● | | ● | ● | 3.689 | 1.509 | |
| D3 | ● | ● | | | ● | 2.445 | 1.294 | |
| D4 | | ● | ● | | ● | 1.890 | 1.378 | |
| D5 | ● | | ● | | ● | 1.372 | 1.379 | |
| D6 | ● | ● | ● | | | 0.994 | 1.201 | |
| D7 | ● | | ● | ● | | 0.828 | 1.286 | |
| D8 | | ● | ● | ● | | 0.644 | | |

PLANETARY GEAR TRAIN OF AUTOMATIC TRANSMISSION FOR VEHICLES

CROSS-REFERENCE TO RELATED APPLICATION

This application claims priority to and the benefit of Korean Patent Application No. 10-2017-0052120, filed on Apr. 24, 2017, which is incorporated herein by reference in its entirety.

FIELD

The present disclosure relates to an automatic transmission for a vehicle.

BACKGROUND

The statements in this section merely provide background information related to the present disclosure and may not constitute prior art.

Recently, increases of oil price has triggered more competition for enhancing fuel efficiency of a vehicle.

In this regard, research on an automatic transmission has been conducted as well to provide better drivability and improve fuel efficiency by achieving more shift stages.

In order to achieve more shift stages for an automatic transmission, the number of parts is typically increased, which may negatively affect installability, production cost, weight and/or power flow efficiency.

As an effort to increase fuel efficiency of an automatic transmission by more shift stages with reduced number of parts, an eight-speed automatic transmission has been recently introduced, and a planetary gear train for an automatic transmission enabling more shift stages has been developed.

An automatic transmission of eight or more shift-stages typically includes three to four planetary gear sets and five to six control elements (frictional elements), and may easily become lengthy, thereby deteriorating installability.

In this regard, disposing planetary gear sets in parallel or employing dog clutches instead of wet-type control elements is sometimes attempted. However, such an arrangement may not be widely applicable, and using dog clutches may easily deteriorate shift-feel.

In addition, we have discovered that a recent eight-speed automatic transmission typically shows a gear ratio span in a level of 6.5 to 7.5, and improvement for better fuel consumption is limited.

SUMMARY

The present disclosure provides a planetary gear train of an automatic transmission for a vehicle having advantages of realizing at least eight forward speeds and at least one reverse speed by a combination of four planetary gear sets, two external gears and five control elements, thereby providing improvement of power delivery performance and fuel consumption as well as improving installability by reducing a total length of the transmission.

In addition, a wide available range of gear teeth of transfer gears enables easily obtaining optimum gear ratios for respective vehicles, thereby improving power delivery performance and fuel consumption.

A planetary gear train of an automatic transmission for a vehicle according to an exemplary form of the present disclosure may include: a first planetary gear set having first, second, and third rotational elements; a second planetary gear set having fourth, fifth, and sixth rotational elements; a third planetary gear set having seventh, eighth, and ninth rotational elements; a fourth planetary gear set having tenth, eleventh, and twelfth rotational elements; an input shaft mounted with the first, second, and third planetary gear sets at an external circumference of the input shaft; and an output shaft disposed in parallel with the input shaft and mounted with the fourth planetary gear set on external circumference of the output shaft; a first shaft fixedly connected with the first rotational element; a second shaft fixedly connected with the second rotational element and the fifth rotational element; a third shaft fixedly connected with the third rotational element and the input shaft; a fourth shaft fixedly connected with the fourth rotational element and the seventh rotational element; a fifth shaft fixedly connected with the sixth rotational element; a sixth shaft fixedly connected with the eighth rotational element; a seventh shaft fixedly connected with the ninth rotational element; an eighth shaft fixedly connected with the tenth rotational element and externally engaged with the first shaft; a ninth shaft fixedly connected with the eleventh rotational element and the output shaft; a tenth shaft fixedly connected with the twelfth rotational element and externally engaged with the sixth shaft; and two transfer gears externally gear-meshed with the first and sixth shafts, respectively.

The fourth shaft may selectively act as a fixed element, the fifth shaft may be selectively connected with the first shaft, the sixth shaft may be selectively connected with the fifth shaft, and the seventh shaft may selectively act as a fixed element.

The first planetary gear set may include a first sun gear as the first rotational element, a first ring gear as the second rotational element, and a first planet carrier as the third rotational element; the second planetary gear set comprises a second sun gear as the fourth rotational element, a second planet carrier as the fifth rotational element, and a second ring gear as the sixth rotational element; the third planetary gear set comprises a third sun gear as the seventh rotational element, a third planet carrier as the eighth rotational element, and a third ring gear as the ninth rotational element; and the fourth planetary gear set comprises a fourth sun gear as the tenth rotational element, a fourth planet carrier as the eleventh rotational element, and a fourth ring gear as the twelfth rotational element.

The first, second, third planetary gear sets may be arranged on the input shaft in the order of the first, second, and third planetary gear sets.

The two transfer gears may include a first transfer gear arranged between the first shaft and the eighth shaft; and a second transfer gear arranged between the sixth shaft and the tenth shaft.

At least two rotational elements among the first, the second, and the third rotational element of the first planetary gear set may be selectively connected to each other such that all rotational elements of the first planetary gear set may integrally rotate.

The planetary gear train may further include a first clutch arranged between the first shaft and the third shaft; a second clutch arranged between the first shaft and the fifth shaft; a third clutch arranged between the fifth shaft and the sixth shaft; a first brake arranged between the fourth shaft and a transmission housing; and a second brake arranged between the seventh shaft and the transmission housing.

The planetary gear train may further include a first clutch arranged between the first shaft and the second shaft; a second clutch arranged between the first shaft and the fifth shaft; a third clutch arranged between the fifth shaft and the sixth shaft; a first brake arranged between the fourth shaft and the transmission housing; and a second brake arranged between the seventh shaft and the transmission housing.

The planetary gear train may further include a second clutch arranged between the first shaft the fifth shaft; a third clutch arranged between the fifth shaft and the sixth shaft; a first brake arranged between the fourth shaft and the transmission housing; and a second brake arranged between the seventh shaft and the transmission housing.

According to a planetary gear train according to an exemplary form of the present disclosure, planetary gear sets are dividedly arranged on input and output shafts disposed in parallel, thereby reducing a length and improving installability.

According to a planetary gear train according to an exemplary form of the present disclosure, at least eight forward speeds and at least one reverse speed may be realized by employing two transfer gears in addition to a combination of planetary gear sets, thereby providing a wide range of varying gear teeth so as to easily achieve desired gear ratio and to easily comply with desired performance for respective vehicles.

In addition, according to a planetary gear train according to an exemplary form of the present disclosure, a gear ratio span of more than 8.8 may be achieved while realizing eight forward speeds and one reverse speed, thereby increasing an engine driving efficiency.

In addition, the linearity of step ratios of shift stages is secured while multi-staging the shift stage with high efficiency, thereby making it possible to improve drivability such as acceleration before and after a shift, an engine speed rhythmic sense, and the like.

In addition, five control elements are applied to the planetary gear train according to an exemplary form of the present disclosure, thereby making it possible to reduce material cost due to reduction of constituent components, and reduce non-controlled control elements so as to reduce a drag torque, and improve a power transmission efficiency so as to reduce fuel consumption.

Further, effects that can be obtained or expected from exemplary forms of the present disclosure are directly or suggestively described in the following detailed description. That is, various effects expected from exemplary forms of the present disclosure will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is an operation chart for respective control elements at respective shift-stages in a planetary gear train according to an exemplary form of the present disclosure;

Figure 1:
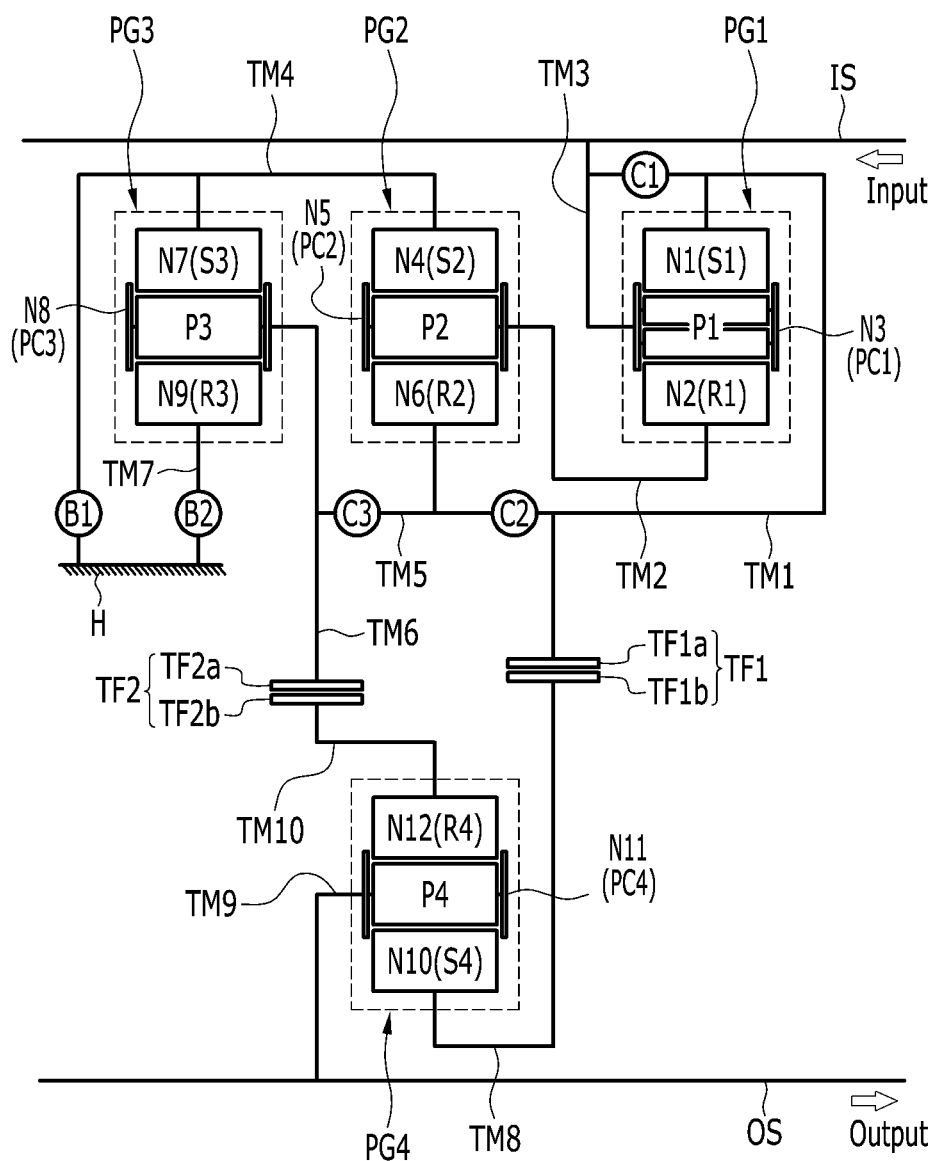
FIG. 1 is a schematic diagram of a planetary gear train according to a first exemplary form of the present disclosure.

The drawings described herein are for illustration purposes only and are not intended to limit the scope of the present disclosure in any way.

DETAILED DESCRIPTION

The present disclosure will be described more fully hereinafter with reference to the accompanying drawings, in which exemplary forms of the present disclosure are shown. As those skilled in the art would realize, the described forms may be modified in various different ways, all without departing from the spirit or scope of the present disclosure.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

Further, as used herein, description of elements being "fixedly" connected or interconnected includes elements that are directly connected, i.e. one element directly connected to another element for rotation therewith.

FIG. 1 is a schematic diagram of a planetary gear train according to a first exemplary form of the present disclosure.

Referring to FIG. 1, a planetary gear train according to a first exemplary form of the present disclosure includes: an input shaft IS; an output shaft OS; first, second, third, and fourth planetary gear sets PG1, PG2, PG3, and PG4; two transfer gears TF1 and TF2; and control elements including three clutches C1, C2, and C3 and two brakes B1, and B2.

The input shaft IS is an input member and the torque from a crankshaft of an engine is input into the input shaft IS, after being torque-converted through a torque converter.

The output shaft OS is an output member, which is arranged in parallel with the input shaft IS, outputs a shifted driving torque to a drive shaft through a differential apparatus.

The first, second, and third planetary gear sets PG1, PG2, and PG3 are arranged at external circumference of the input shaft IS and form a main shifting portion. The first, second, third planetary gear sets PG1, PG2, and PG3 are arranged on the input shaft IS in the order of first, second, and third planetary gear sets PG1, PG2, and PG3.

The fourth planetary gear set PG4 is arranged at external circumference of the output shaft OS disposed in parallel with the input shaft IS and forms an auxiliary shifting portion.

The first planetary gear set PG1 is a double pinion planetary gear set, and includes a first sun gear S1, a first ring gear R1 that is externally engaged with a first pinion P1 externally engaged with the first sun gear S1, and a first planet carrier PC1 supporting the first pinion P1. The first sun gear S1 acts as a first rotational element N1, the first ring gear R1 acts as a second rotational element N2, and first planet carrier PC1 acts as a third rotational element N3.

The second planetary gear set PG2 is a single pinion planetary gear set, and includes a second sun gear S2, a second planet carrier PC2 that supports the second pinion P2 externally engaged with the second sun gear S2, and a second ring gear R2 that is internally engaged with the second pinion P2. The second sun gear S2 acts as a fourth rotational element N4, the second planet carrier PC2 acts as a fifth rotational element N5, and the second ring gear R2 acts as a sixth rotational element N6.

The third planetary gear set PG3 is a single pinion planetary gear set, and includes a third sun gear S3, a third planet carrier PC3 that supports the third pinion P3 externally engaged with a third sun gear S3, and a third ring gear R3 that is internally engaged with the third pinion P. The third sun gear S3 acts as a seventh rotational element N7, the third planet carrier PC3 acts as a eighth rotational element N8, and the third ring gear R3 acts as a ninth rotational element N9.

The fourth planetary gear set PG4 is a single pinion planetary gear set, and includes a fourth sun gear S4, a fourth planet carrier PC4 that supports the fourth pinion P4 externally engaged with the fourth sun gear S4, and a fourth ring gear R4 that is internally engaged with the fourth pinion P4. The fourth sun gear S4 acts as a tenth rotational element N10, the fourth planet carrier PC4 acts as an eleventh rotational element N11, and the fourth ring gear R4 acts as a twelfth rotational element N12.

In the arrangement of the first, second, and third planetary gear sets PG1, PG2, and PG3, the second rotational element N2 is fixedly connected with the fifth rotational element N5, and the fourth rotational element N4 is fixedly connected with the seventh rotational element N7, by a corresponding shaft selected from seven shafts TM1 to TM7.

Three shafts TM8 to TM10 are fixedly connected to the fourth planetary gear set PG4.

The ten shafts TM1 to TM10 are hereinafter described in detail.

Each of the ten shafts TM1-TM10 may be a rotational member that fixedly interconnects the input and output shafts and rotational elements of the planetary gear set PG1, PG2, PG3, and PG4, may be a rotational member that selectively interconnect the rotational element and the transmission housing H, or may be a fixed member that fixedly connect the rotational element to the transmission housing H.

The first shaft TM1 is fixedly connected with the first rotational element N1 (first sun gear S1).

The second shaft TM2 is fixedly connected with the second rotational element N2 (first ring gear R1) and the fifth rotational element N5 (second planet carrier PC2).

The third shaft TM3 is fixedly connected with the third rotational element N3 (first planet carrier PC1), selectively connected with the first shaft TM1, and also fixedly connected with the input shaft IS, thereby always acting as an input element.

The fourth shaft TM4 fixedly interconnects the fourth rotational element N4 (second sun gear S2) and the seventh rotational element N7 (third sun gear S3), and is selectively connected with the transmission housing H.

The fifth shaft TM5 is fixedly connected with the sixth rotational element N6 (second ring gear R2), and is selectively connected with the first shaft TM1.

The sixth shaft TM6 is fixedly connected with the eighth rotational element N8 (third planet carrier PC3), and is selectively connected with the fifth shaft TM5.

The seventh shaft TM7 is fixedly connected with the ninth rotational element N9 (third ring gear R3), and is selectively connected with the transmission housing H.

The eighth shaft TM8 is fixedly connected with the tenth rotational element N10 (fourth sun gear S4), and is externally gear-meshed with the first shaft TM1.

The ninth shaft TM9 is fixedly connected with the eleventh rotational element N11 (fourth planet carrier PC4), and is also fixedly connected with the output shaft OS, thereby always acting as an output element.

The tenth shaft TM10 is fixedly connected with the twelfth rotational element N12 (fourth ring gear R4), and is externally gear-meshed with the sixth shaft TM6.

The two transfer gears TF1 and TF2 deliver a shifted torque of the main shifting portion having the first, second, and third planetary gear sets PG1, PG2, and PG3 to the auxiliary shifting portion having the fourth planetary gear set PG4.

The first transfer gear TF1 includes a first transfer drive gear TF1$a$ connected with the first shaft TM1 and a first transfer driven gear TF1$b$ connected with the eighth shaft TM8, such that the first transfer gear TF1 externally gear-meshes the first shaft TM1 and the eighth shaft TM8.

The second transfer gear TF2 includes a second transfer drive gear TF2$a$ connected with the sixth shaft TM6 and a second transfer driven gear TF2$b$ connected with the tenth shaft TM10, such that the second transfer gear TF2 externally gear-meshes the sixth shaft TM6 and the tenth shaft TM10.

As a result, respective shafts connected by the first and second transfer gears TF1 and TF2 rotate in opposite directions, and the gear ratios of the first and second transfer gears TF1 and TF2 may be preset in consideration of desired speed ratio of the transmission.

The control elements include three clutches C1, C2, and C3 and two brakes B1 and B2, and are arranged as follows.

The first clutch C1 is arranged between the first shaft TM1 and the third shaft TM3 such that the first shaft TM1 and the third shaft TM3 may selectively connected with each other.

The second clutch C2 is arranged between the first shaft TM1 and the fifth shaft TM5 such that the first shaft TM1 and the fifth shaft TM5 may selectively connected with each other.

The third clutch C3 is arranged between the fifth shaft TM5 and the sixth shaft TM6 such that the fifth shaft TM5 and the sixth shaft TM6 may selectively connected with each other.

The first brake B1 is arranged between the fourth shaft TM4 and the transmission housing H such that the fourth shaft TM4 may selectively act as a fixed element.

The second brake B2 is arranged between the seventh shaft TM7 and the transmission housing H such that the seventh shaft TM7 may selectively act as a fixed element.

In the first exemplary form of the present disclosure, the first clutch C1 selectively connects the first shaft TM1 and the third shaft TM3. Herein, the first clutch C1 selectively connects at least two rotational elements among the first, second, and third rotational element N1, N2, and N3 of the first planetary gear set PG1 such that the first planetary gear set PG1 may integrally rotate. The first clutch C1 selectively connects two shafts among the first shaft TM1, second shaft TM2, and third shaft TM3, such that the first planetary gear set PG1 becomes locked and integrally rotates Herein, the control elements of the first, second, third clutch C1, C2, and C3, the first, second brake B1 and B2 as hydraulic friction coupling units which are operated by hydraulic pressure supplied from a hydraulic control device primarily adopt a wet multi-disk type hydraulic friction coupling unit. But the control elements may be constituted by a coupling unit such as a dog clutch, an electronic clutch and a magnetic particle clutch which may be operated according to an electric signal supplied from an electronic control device FIG. 2 is an operational chart for respective control elements at respective shift-stages in a planetary gear train according to a first exemplary form of the present disclosure.

Referring to FIG. 2, a planetary gear train according to a first exemplary form of the present disclosure realizes shifting by operating three control elements among the three clutches C1, C2, and C3 and the two brakes B1 and B2.

[The Forward First Speed]

In the forward first speed shift-stage D1, the first clutch C1 and the first and second brakes B1 and B2 are simultaneously operated.

As a result, the first shaft TM1 is connected with the third shaft TM3 by the operation of the first clutch C1. In this state, the torque of the input shaft IS is input to the third shaft TM3, and the fourth and seventh shaft TM4 and TM7 acts as a fixed element by the operation of the first and second brakes B1 and B2, thereby realizing the forward first speed by operation of respective shafts and outputting a shifted torque to the output shaft OS connected with the ninth shaft TM9.

[The Forward Second Speed]

In the forward second speed shift-stage D2, the second clutch C2 and the first and second brakes B1 and B2 are simultaneously operated.

As a result, the first shaft TM1 is connected with the fifth shaft TM5 by the operation of the second clutch C2. In this state, the torque of the input shaft IS is input to the third shaft TM3, and the fourth and seventh shaft TM4 and TM7 act as a fixed element by the operation of the first and second brakes B1 and B2, thereby realizing the forward second speed by operation of respective shafts and outputting a shifted torque to the output shaft OS connected with the ninth shaft TM9.

[The Forward Third Speed]

In the forward third speed shift-stage D3, the first clutch C1, the second clutch C2 and the second brake B2 are simultaneously operated.

As a result, the first shaft TM1 is connected with the third shaft TM3 by the operation of the first clutch C1, and the first shaft TM1 is connected with the fifth shaft TM5 in the operation of the second clutch C2. In this state, the torque of the input shaft IS is input to the third shaft TM3, and the seventh shaft TM7 acts as a fixed element by the operation of the second brake B2, thereby realizing the forward third speed by operation of respective shafts and outputting a shifted torque to the output shaft OS connected with the ninth shaft TM9.

[The Forward Fourth Speed]

In the forward fourth speed shift-stage D4, the second C2, the third clutch C3, and the second brake B2 are simultaneously operated.

As a result, the first shaft TM1 is connected with the fifth shaft TM5 by the operation of the second clutch C2, and the fifth shaft TM5 is connected with the sixth shaft TM6 by the operation of the third clutch C3. In this state, the torque of the input shaft IS is input to the third shaft TM3, and the seventh shaft TM7 acts as a fixed element by the operation of the second brake B2, thereby realizing the forward fourth speed by operation of respective shafts and outputting a shifted torque to the output shaft OS connected with the ninth shaft TM9.

[The Forward Fifth Speed]

In the forward fifth speed shift-stage D5, the first C1, the third clutch C3, and the second brake B2 are simultaneously operated.

As a result, the first shaft TM1 is connected with the third shaft TM3 by the operation of the first clutch C1, and the fifth shaft TM5 is connected with the sixth shaft TM6 by the operation of the third clutch C3. In this state, the torque of the input shaft IS is input to third shaft TM3, and the seventh shaft TM7 acts as a fixed element by the operation of the second brake B2, thereby realizing the forward fifth speed by operation of respective shafts and outputting a shifted torque to the output shaft OS connected with the ninth shaft TM9.

[The Forward Sixth Speed]

In the forward sixth speed shift-stage D6, the first clutch C1, the second clutch C2, and the third clutch C3 are simultaneously operated.

As a result, the first shaft TM1 is connected with the third shaft TM3 by the operation of the first clutch C1, the first shaft TM1 is connected with the fifth shaft TM5 by the operation of the second clutch C2, and the fifth shaft TM5 is connected with the sixth shaft TM6 by the operation of the third clutch C3. In this state, the torque of the input shaft IS is input to the third shaft TM3, thereby realizing the forward sixth speed by operation of respective shafts and outputting a shifted torque to the output shaft OS connected with the ninth shaft TM9.

[The Forward Seventh Speed]

In the forward seventh speed shift-stage D7, the first clutch C1, the third clutch C3, and the first brake B1 are simultaneously operated.

As a result, the first shaft TM1 is connected with the third shaft TM3 by the operation of the first clutch C1, and the fifth shaft TM5 is connected with the sixth shaft TM6 by the operation of the third clutch C3. In this state, the torque of the input shaft IS is input to the third shaft TM3, and the fourth shaft TM4 acts as a fixed element by the operation of the first brake B1, thereby realizing the forward seventh speed by operation of respective shafts and outputting a shifted torque to the output shaft OS connected with the ninth shaft TM9.

[The Forward Eighth Speed]

In the forward eighth speed shift-stage D8, the second clutch C2, the third clutch C3, and the first brake B1 are simultaneously operated.

As a result, the first shaft TM1 is connected with the fifth shaft TM5 by the operation of the second clutch C2, and the fifth shaft TM5 is connected with the sixth shaft TM6 by the operation of the third clutch C3. In this state, the torque of the input shaft IS is input to the third shaft TM3, and the fourth shaft TM4 acts as a fixed element by the operation of the first brake B1, thereby realizing the forward eighth speed by operation of respective shafts and outputting a shifted torque to the output shaft OS connected with the ninth shaft TM9.

[The Reverse Speed]

In the reverse speed shift-stage REV, the third clutch C3, the first brake B1, and the second brake B2 are simultaneously operated.

As a result, the fifth shaft TM5 is connected with the sixth shaft TM6 by the operation of the third clutch C3. In this state, the torque of the input shaft IS is input to the third shaft TM3, and the fourth shaft TM4 and the seventh shaft TM7 act as fixed element by the operation of the first brake B1 and the second brake B2, thereby realizing the reverse speed by operation of respective shafts and outputting a shifted torque to the output shaft OS connected with the ninth shaft TM9.

Figure 3:
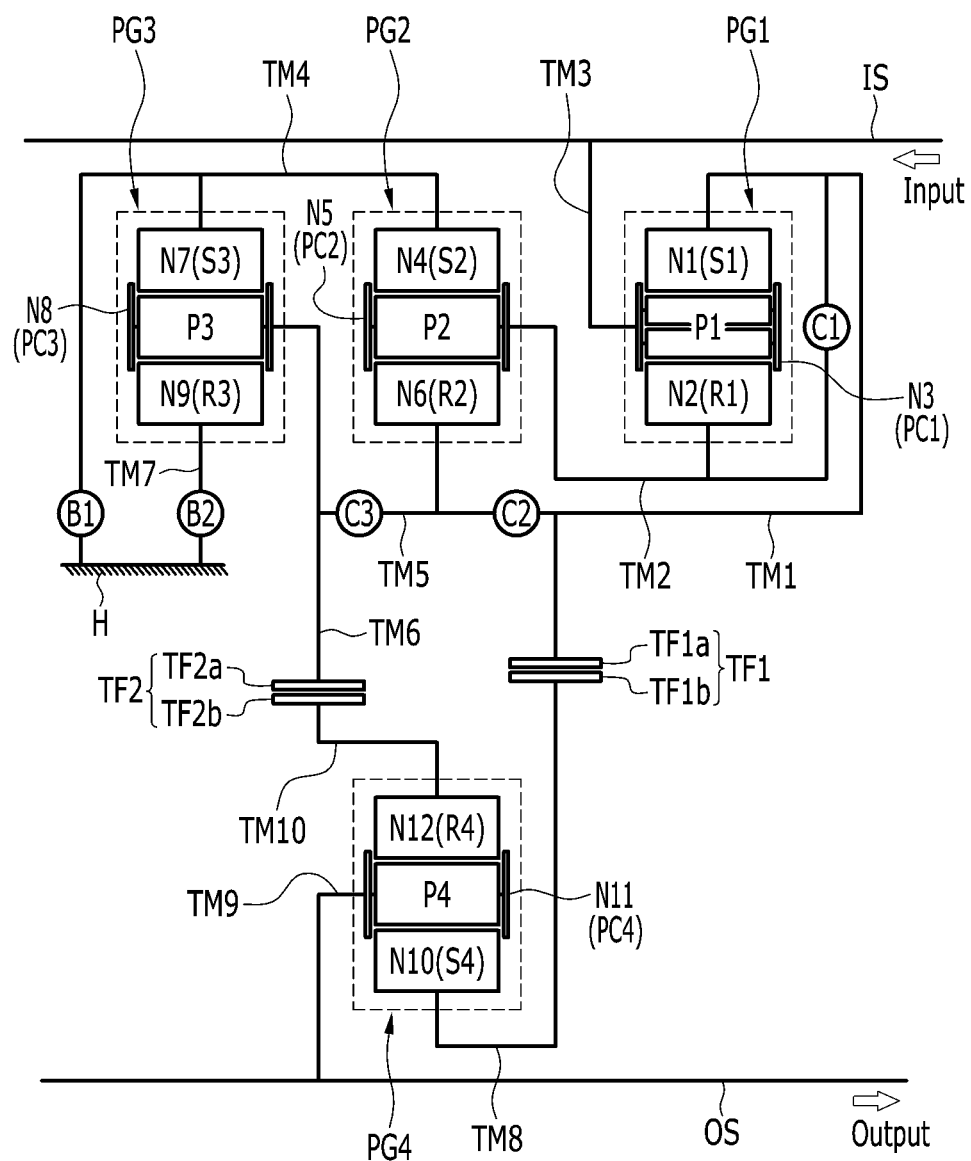
FIG. 3 is a schematic diagram of a planetary gear train according to a second exemplary form of the present disclosure.

FIG. 3 is a schematic diagram of a planetary gear train according to a second exemplary form of the present disclosure.

According to a planetary gear train according to a first exemplary form of the present disclosure, the first clutch C1 for unifying the first planetary gear set PG1 is arranged between the first shaft TM1 and the third shaft TM3 as shown in FIG. 1. However, in a planetary gear train according to a second exemplary form as illustrated in FIG. 3, the first clutch C1 is arranged between the first shaft TM1 and the second shaft TM2.

As a result, the second exemplary form shows the same function and operation, while being different from the first exemplary form in a mere location of the first clutch C1.

Figure 4:
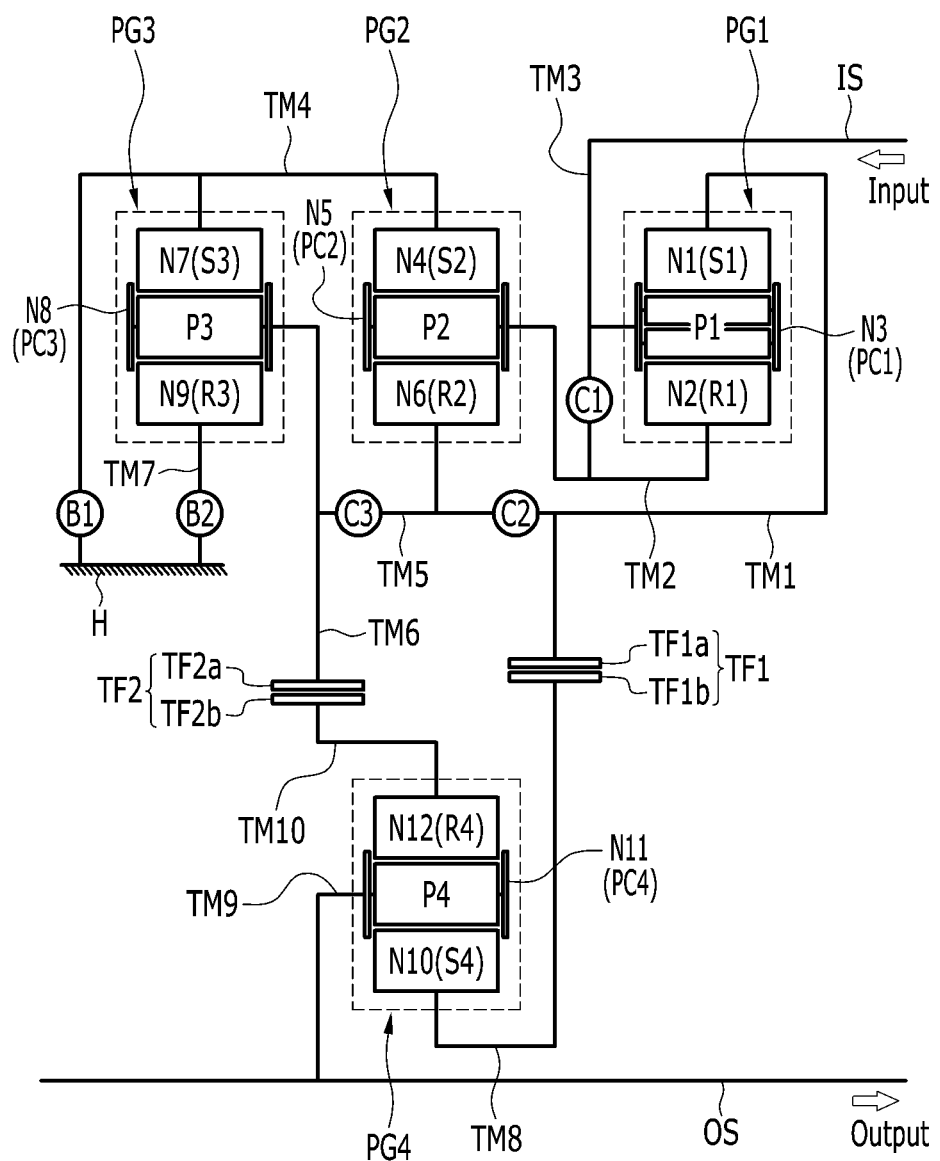
FIG. 4 is a schematic diagram of a planetary gear train according to a third exemplary form of the present disclosure.

FIG. 4 is a schematic diagram of a planetary gear train according to a third exemplary form of the present disclosure.

According to a planetary gear train according to a first exemplary form of the present disclosure, the first clutch C1 for unifying the first planetary gear set PG1 is arranged between the first shaft TM1 and the third shaft TM3 as shown in FIG. 1. However, in a planetary gear train according to a third exemplary form as illustrated in FIG. 4, the first clutch C1 is arranged between the second shaft TM2 and the third shaft TM3.

As a result, the third exemplary form shows the same function and operation, while being different from the first exemplary form in a mere location of the first clutch C1.

As described above, according to a planetary gear train according to an exemplary form of the present disclosure, at least eight forward speeds and at least one reverse speed may be realized by a combination of four planetary gear sets, two transfer gears, and five control elements, thereby providing improvement of power delivery performance and fuel consumption and improving installability by shortening the length of an automatic transmission.

In addition, according to a planetary gear train according to an exemplary form of the present disclosure, two transfer gears of external gears arranged on the output shaft OS are employed in addition to three planetary gear sets, and thus, gear teeth may be widely varied so as to easily achieve desired gear ratio and to easily comply with desired performance for respective vehicles.

In addition, according to a planetary gear train according to an exemplary form of the present disclosure, a gear ratio span of more than 8.8 may be achieved while realizing at least eight forward speeds and at least one reverse speed, thereby increasing an engine driving efficiency.

In addition, the linearity of step ratios of shift stages is secured while multi-staging the shift stage with high efficiency, thereby making it possible to improve drivability such as acceleration before and after a gear shift, an engine speed rhythmic sense, and the like.

In addition, five control elements are applied to the planetary gear train according to an exemplary form of the present disclosure, thereby making it possible to reduce material cost due to reduction of constituent components, and reduce non-controlled control elements so as to reduce a drag torque, and improve a power transmission efficiency so as to reduce fuel consumption.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the appended claims.

DESCRIPTION OF SYMBOLS

PG1,PG2,PG3,PG4 . . . first, second, third, fourth planetary gear set
S1,S2,S3,S4 . . . first, second, third, fourth sun gear
PC1,PC2,PC3,PC4 . . . first, second, third, fourth planet carrier
R1,R2,R3,R4 . . . first, second, third, fourth ring gear
IS . . . input shaft
OS . . . output shaft
B1,B2 . . . first, second brake
C1,C2,C3 . . . first, second, third clutch
TF1,TF2 . . . first, second transfer gear
TM1,TM2,TM3,TM4,TM5,TM6,TM7,TM8,TM9,TM10 . . . first, second, third, fourth, fifth, sixth, seventh, eighth, ninth, tenth shaft While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the appended claims.

What is claimed is:

1. A planetary gear train of an automatic transmission for a vehicle, the planetary gear train comprising:
   a first planetary gear set having first, second, and third rotational elements;
   a second planetary gear set having fourth, fifth, and sixth rotational elements;
   a third planetary gear set having seventh, eighth, and ninth rotational elements;
   a fourth planetary gear set having tenth, eleventh, and twelfth rotational elements;
   an input shaft mounted with the first, second, and third planetary gear sets at an external circumference of the input shaft; and
   an output shaft disposed in parallel with the input shaft and mounted with the fourth planetary gear set mounted coaxially with the output shaft;
   a first shaft fixedly connected with the first rotational element;
   a second shaft fixedly connected with the second rotational element and the fifth rotational element;
   a third shaft fixedly connected with the third rotational element and the input shaft;
   a fourth shaft fixedly connected with the fourth rotational element and the seventh rotational element;
   a fifth shaft fixedly connected with the sixth rotational element;
   a sixth shaft fixedly connected with the eighth rotational element;
   a seventh shaft fixedly connected with the ninth rotational element;
   an eighth shaft fixedly connected with the tenth rotational element and engaged with the first shaft;
   a ninth shaft fixedly connected with the eleventh rotational element and the output shaft;
   a tenth shaft fixedly connected with the twelfth rotational element and engaged with the sixth shaft;
   a first transfer gear set operatively connected to the first shaft; and
   a second transfer gear set operatively connected to the sixth shaft.

2. The planetary gear train of claim 1, wherein
   the fourth shaft selectively acts as a fixed element,
   the fifth shaft is selectively connected with the first shaft, the sixth shaft is selectively connected with the fifth shaft, and the seventh shaft selectively acts as a fixed element.

3. The planetary gear train of claim 1, wherein:
the first planetary gear set comprises a first sun gear as the first rotational element, a first ring gear as the second rotational element, and a first planet carrier as the third rotational element;
the second planetary gear set comprises a second sun gear as the fourth rotational element, a second planet carrier as the fifth rotational element, and a second ring gear as the sixth rotational element;
the third planetary gear set comprises a third sun gear as the seventh rotational element, a third planet carrier as the eighth rotational element, and a third ring gear as the ninth rotational element; and
the fourth planetary gear set comprises a fourth sun gear as the tenth rotational element, a fourth planet carrier as the eleventh rotational element, and a fourth ring gear as the twelfth rotational element.

4. The planetary gear train of claim 1, wherein
the first, second, third planetary gear sets are arranged on the input shaft in the order of the first, second, and third planetary gear sets.

5. The planetary gear train of claim 1, wherein
the first transfer gear set is arranged between the first shaft and the eighth shaft; and
the second transfer gear set is arranged between the sixth shaft and the tenth shaft.

6. The planetary gear train of claim 1, wherein at least two rotational elements among the first, the second, and the third rotational element of the first planetary gear set are selectively connected to each other such that all rotational elements of the first planetary gear set integrally rotate.

7. The planetary gear train of claim 6, further comprising:
a first clutch arranged between the first shaft and the third shaft;
a second clutch arranged between the first shaft and the fifth shaft;
a third clutch arranged between the fifth shaft and the sixth shaft;
a first brake arranged between the fourth shaft and a transmission housing; and
a second brake arranged between the seventh shaft and the transmission housing.

8. The planetary gear train of claim 6, further comprising:
a first clutch arranged between the first shaft and the second shaft;
a second clutch arranged between the first shaft and the fifth shaft;
a third clutch arranged between the fifth shaft and the sixth shaft;
a first brake arranged between the fourth shaft and a transmission housing; and
a second brake arranged between the seventh shaft and the transmission housing.

9. The planetary gear train of claim 6, further comprising:
a first clutch arranged between the second shaft and the third shaft;
a second clutch arranged between the first shaft the fifth shaft;
a third clutch arranged between the fifth shaft and the sixth shaft;
a first brake arranged between the fourth shaft and a transmission housing; and
a second brake arranged between the seventh shaft and the transmission housing.

10. A planetary gear train of an automatic transmission for a vehicle, the planetary gear train comprising:
a first planetary gear set having first, second, and third rotational elements;
a second planetary gear set having fourth, fifth, and sixth rotational elements;
a third planetary gear set having seventh, eighth, and ninth rotational elements;
a fourth planetary gear set having tenth, eleventh, and twelfth rotational elements;
an input shaft mounted with the first, second, and third planetary gear sets at an external circumference of the input shaft; and
an output shaft disposed in parallel with the input shaft, wherein the fourth planetary gear set mounted coaxially with the output shaft,
wherein the first rotational element is operatively connected to the tenth rotational element through a first transfer gear set,
the second rotational element is fixedly connected with the fifth rotational element,
the third rotational element is fixedly connected with the input shaft,
the fourth rotational element is fixedly connected with the seventh rotational element,
the eighth rotational element is operatively connected to the twelfth rotational element through a second transfer gear set, and
the eleventh rotational element is fixedly connected with the output shaft.

11. The planetary gear train of claim 10, wherein
the first planetary gear set includes a first sun gear as the first rotational element, a first planet carrier as the second rotational element, and a first ring gear as the third rotational element;
the second planetary gear set includes a second sun gear as the fourth rotational element, a second ring gear as the fifth rotational element, and a second planet carrier as the sixth rotational element;
the third planetary gear set includes a third sun gear as the seventh rotational element, a third planet carrier as the eighth rotational element, and a third ring gear as the ninth rotational element; and
the fourth planetary gear set includes a fourth sun gear as the tenth rotational element, a fourth planet carrier as the eleventh rotational element, and a fourth ring gear as the twelfth rotational element.

12. The planetary gear train of claim 10, wherein
the first rotational element is selectively connected with the sixth rotational element,
the sixth rotational element is selectively connected with the eighth rotational element,
the seventh rotational element is selectively connected with a transmission housing,
the ninth rotational element is selectively connected with the transmission housing, and
the first planetary gear set is configured to selectively connect two rotational elements to each other among the first, the second, and the third rotational elements.

13. The planetary gear train of claim 12, wherein
the first transfer gear set is arranged between the first rotational element and the tenth rotational element; and
the second transfer gear set is arranged between the eighth rotational element and the twelfth rotational element.

14. The planetary gear train of claim 12, further comprising:
- a first clutch configured to selectively connect the first rotational element and the third rotational element;
- a second clutch configured to selectively connect the first rotational element and the sixth rotational element;
- a third clutch configured to selectively connect the sixth rotational element and the eighth rotational element;
- a first brake configured to selectively connect the seventh rotational element and the transmission housing; and
- a second brake configured to selectively connect the ninth rotational element and the transmission housing.

15. The planetary gear train of claim 12, further comprising:
- a first clutch configured to selectively connect the first rotational element and the second rotational element;
- a second clutch configured to selectively connect the first rotational element and the sixth rotational element;
- a third clutch configured to selectively connect the sixth rotational element and the eighth rotational element;
- a first brake configured to selectively connect the seventh rotational element and the transmission housing; and
- a second brake configured to selectively connect the ninth rotational element and the transmission housing.

16. The planetary gear train of claim 12, further comprising:
- a first clutch selectively configured to connect the second rotational element and the third rotational element;
- a second clutch configured to selectively connect the first rotational element and the sixth rotational element;
- a third clutch configured to selectively connect the sixth rotational element and the eighth rotational element;
- a first brake configured to selectively connect the seventh rotational element and the transmission housing; and
- a second brake configured to selectively connect the ninth rotational element and the transmission housing.

* * * * *